US007305882B1

(12) United States Patent
May

(10) Patent No.: US 7,305,882 B1
(45) Date of Patent: Dec. 11, 2007

(54) ACCELEROMETER USING MAGNETIC TRANSDUCER TECHNOLOGY

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 1167 days.

(21) Appl. No.: 10/110,007

(22) PCT Filed: Oct. 5, 2000

(86) PCT No.: PCT/EP00/09783

§ 371 (c)(1),
(2), (4) Date: Jul. 10, 2002

(87) PCT Pub. No.: WO01/27638

PCT Pub. Date: Apr. 19, 2001

(30) Foreign Application Priority Data

Oct. 8, 1999 (GB) .................................. 9923894.1

(51) Int. Cl.
*G01P 15/11* (2006.01)
(52) U.S. Cl. .................................... 73/514.31
(58) Field of Classification Search ............. 73/514.16, 73/514.31, 514.01, 514.35; 324/207.13
See application file for complete search history.

(56) References Cited

U.S. PATENT DOCUMENTS

| 2,643,869 | A | * | 6/1953 | Clark ........................ 73/514.31 |
| 3,867,844 | A | * | 2/1975 | Shimizu et al. ........... 73/514.31 |
| 3,877,314 | A | * | 4/1975 | Bernin ...................... 73/514.31 |
| 4,144,765 | A | * | 3/1979 | Aske ......................... 73/514.31 |
| 4,322,973 | A | * | 4/1982 | Iwasaki .................... 73/514.31 |
| 4,372,520 | A | * | 2/1983 | Shutt ........................ 73/514.31 |
| 5,275,049 | A |   | 1/1994 | Schiessle et al. .......... 73/517 R |
| 5,351,555 | A |   | 10/1994 | Garshelis ................. 73/862.36 |
| 5,465,627 | A |   | 11/1995 | Garshelis ................ 73/862.335 |
| 5,520,059 | A |   | 5/1996 | Garshelis ................ 73/862.335 |
| 5,580,084 | A |   | 12/1996 | Gioutsos ..................... 380/735 |
| 6,131,457 | A | * | 10/2000 | Sato ........................ 73/514.31 |

FOREIGN PATENT DOCUMENTS

| SU | 1833501 | 6/1991 |
| WO | WO 99/1150 | 4/1999 |
| WO | WO 99/21151 | 4/1999 |
| WO | WO 99/56099 | 11/1999 |
| WO | WO 01/13081 A1 | 2/2001 |

* cited by examiner

*Primary Examiner*—Helen Kwok
(74) *Attorney, Agent, or Firm*—Blank Rome LLP

(57) ABSTRACT

The accelerometer uses magnetic transducer technology. A mass-block, mounted to a base by an elongate member (shaft), moves relative to the base due to accelerations. The elongate-member has at least one magnetised transducer region (circumferential or longitudinal), which emanates a magnetic field as a function of member flexure due to acceleration of the mass-block. A sensor adjacent the transducer detects the field and derives a acceleration-representing signal. Alternatively, a mass-block is mounted to a central hub of a disc which is radially secured and has an intermediate region that flexes in response to acceleration. The intermediate region is magnetised to provide the magnetic transducer element. Otherwise, the mass-block is supported in an aperture of a reference-base by cores of inductors. The core permeability is a function of the compressive tensile forces on the cores due to acceleration of the mass-block. Resulting acceleration-dependent inductance changes provide signals for deriving an acceleration-representing output.

14 Claims, 3 Drawing Sheets

ACCELEROMETER USING MAGNETIC TRANSDUCER TECHNOLOGY

FIELD OF THE INVENTION

This invention relates to an accelerometer.

In one aspect the invention is based on the novel concept of changes in the magnetic field emanated by a magnetised transducer element when subject to forces generated by an acceleration. In another aspect, the invention is based on a force-sensitive parameter of a magnetic material.

BACKGROUND OF THE INVENTION

There have been prior proposals to use magnetised transducer elements for torque measurement the transducer element being a ring attached to a torqued shaft or the shaft itself. In this connection reference is made to U.S. Pat. Nos. 5,351,555, 5,465,627 and 5,520,059 and to published PCT Applications WO99/21150, WO99/21151 and WO99/56099. In these specifications the ring or shaft is of a magnetoelastic material circumferentially magnetised, that is the magnetisation forms a closed loop around the shaft. While such transducer elements are usable in the practice of this invention, other patterns of magnetisation are usable and do not necessarily rely on magnetoelasticity, and other shapes of transducer element may be employed. One other pattern of magnetisation which may be employed in the practice of this invention is longitudinal magnetisation of the transducer region. One form of longitudinal magnetisation is disclosed in International patent application PCT/GB00/03119 filed 14th Aug. 2000 and published under the number WO01/13081.

As already indicated magnetised transducer elements have been previously proposed for torque measurement, particularly for a rotating shaft, in which a magnetic field sensor arrangement is provided adjacent but not in contact with the transducer element to sense a torque-dependent field.

WO99/56099 also discloses the use of such sensor systems to sense forces applied in elongate members (shafts). However, the present applicant is not aware of any previous proposal to apply this technology in the field of accelerometers.

SUMMARY OF THE INVENTION

In one form of accelerometer embodying the invention, a member connects a part to a base, where the part is movable or capable of attempting movement with respect to the base so that the member is subject to flexure when the part is accelerated relative to the base. The member has at least one transducer region in which a magnetic field is established and from which a field is emanated that is a function of the flexure of the member. A sensor means responds to the emanated field to provide a signal representing the field and is connected in a circuit to derive a signal representing the acceleration of the part relative to the base. The magnetic field established in the transducer region may be of the circumferential or longitudinal kind or other field exhibiting flexure-responsive changes capable of being sensed.

In another form of the invention advantage is taken of change in the permeability of an inductor core as a function of the tensile and/or compressive forces applied to the core. A part is movable, or capable of attempting movement, with respect to a reference base. The part is suspended in position with respect to the base by means of at least one inductor core, preferably a plurality of cores. In a preferred embodiment, the movable part is supported within an aperture in the base by at least three angularly spaced, preferably equiangularly spaced, inductor cores whose permeability is a function of tensile and/or compressive forces generated by relative movement between the part and the base. Each inductor core has a respective winding thereon. The windings are connected in a sensor circuit responsive to changes in winding signals dependent on the core permeabilities to derive an acceleration-indicative signal.

Aspects and features of this invention for which protection is presently sought are set out in the following Claims following this description.

BRIEF DESCRIPTION OF THE DRAWINGS

The invention and its practice will be better understood by reference to the following description taken in conjunction with the accompanying drawings, in which.

DESCRIPTION OF THE PREFERRED EMBODIMENTS

Figure 1:
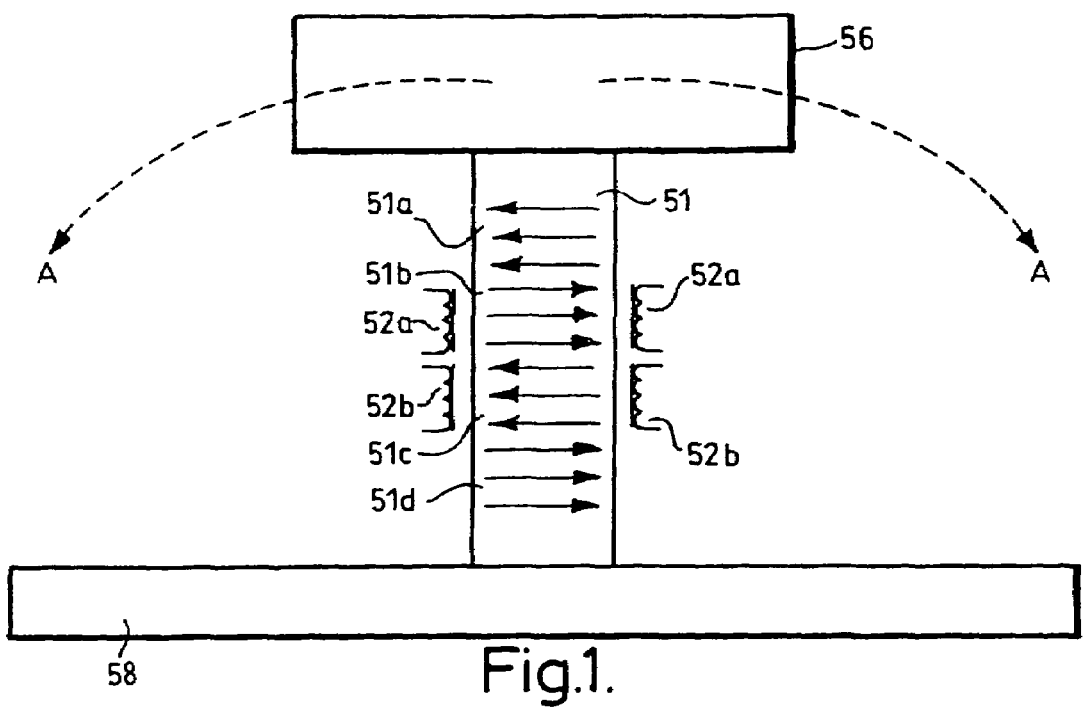
FIG. 1 shows an accelerometer according to the invention employing a circumferentially magnetised, magnetoelastic sensor shaft.

FIG. 1 shows an accelerometer in which a sensor shaft 51 is mounted between a reference base or platform 58 and a physical mass 56, referred to as a mass-block, which is subject to acceleration relative to the base 58. The mass-block is shown as subject to accelerating forces A in the plane of the paper—along one axis—though in practical situations measurement of acceleration along an orthogonal axis will be required to cover any acceleration of block 56 in a plane normal to the paper. The lower end of the shaft 51 in this regard is fixed with respect to the base 58 and the upper end moves with the mass-block 56 and both move with respect to the base so as to flex the shaft. The term "shaft" is used to generally indicate an elongate member of magnetisable material or any member capable of flexing in the required manner.

In the embodiment of FIG. 1, the shaft—which may be more generally referred to as the sensor host—is of a magnetoelastic material and is itself magnetised in four adjacent regions 51a, b, c and d. The magnetisation is circumferential, adjacent regions being magnetised by means such as later described with reference to FIG. 3a.

In each region 51a-d, the magnetisation extends in a continuous loop as shown by the arrows. Adjacent regions are of opposite polarity magnetisations. Preferably at least three regions are employed. In the three region case the inner region provides the transducer element, the two outer regions acting as keeper or guard regions. In the four region case illustrated, the two inner regions 51b and c provide a pair of transducer elements with a better capability of compensating external or ambient magnetic fields.

Adjacent each transducer region at least one sensor 52a, 52b respectively is mounted to detect the magnetic field emanated by the transducer regions when shaft 51 is flexed. For two-axis sensing of accelerations, another pair of sensors is mounted at right angles to the pair shown for each transducer region. Various forms of magnetic field sensor are known. It is preferred to use saturating inductor sensors of the kind described in International Application PCT/GB98/01357 published under the number WO98/52063. Other types of sensor include Hall effect and magnetoresistive devices. The signals from the sensors are processed by circuits not shown in FIG. 1. The signals are a function of the detected magnetic field which in turn is a function of the flexing of the shaft 51. These signals may be duly processed to obtain the acceleration component of the mass-block 56 with respect to base 58.

One important application of the invention is in automobiles where acceleration forces can be measured by providing a shaft 51 between the vehicle chassis acting as a reference base and the engine block acting as the mass-block.

Figure 2:
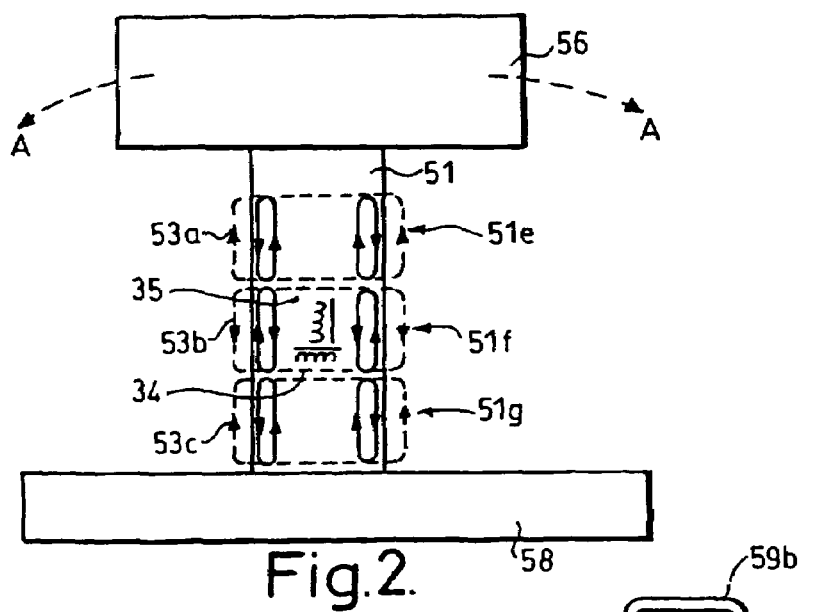
FIG. 2 shows an accelerometer according to the invention employing longitudinally magnetised sensor shaft.

FIG. 2 shows a variation of the accelerometer of FIG. 1 in which the shaft 51 of a magnetisable material has three longitudinally magnetised regions 51e, f and g of which the inner region 51f is used as a transducer element. The magnetisation in this case also extends around the shaft but is in the axial direction at the surface. The form of longitudinal magnetisation used is that which may be referred to as circumferential (tangential)—sensing longitudinal magnetisation. It will be seen that the magnetisation of each region forms a toroidal field about the shaft axis and extending inwardly from the shaft surface.

The magnetic field predominantly closes within the shaft so that a torus of magnetic field is established. However some field 53a, b, c will extend in an axial direction externally of the shaft. This field distorts under the stress/strain induced in the shaft 51 by movement of the mass-block 56 relative to the reference base 58. The external field changes are detectable by appropriately placed sensors. For movement of mass-block 56 in the A-A direction a pair of transverse oriented sensors 34 are mounted, one in front of, one behind the shaft at region 51f to detect the circumferentially (tangentially)-directed component of the field due to flexing. A pair of axially oriented sensors 35 are likewise placed to detect the quiescent flux as a reference. Further orthogonally positioned sensors 34 can be positioned for two-axis sensing. In FIG. 2, the outer regions 51e and 51g act as guard regions and for this purpose they may be circumferentially rather than longitudinally magnetised.

Figures 3A, 3B:
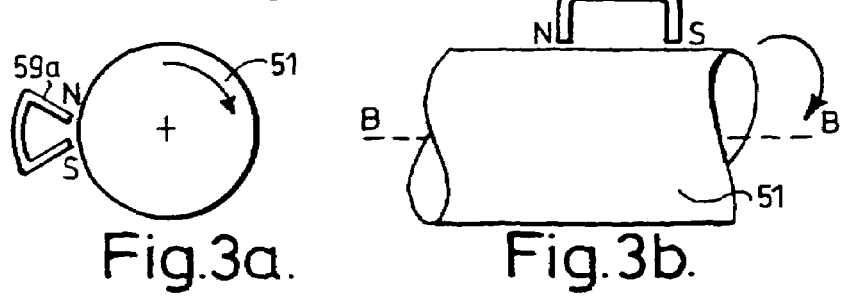
FIGS. 3a and 3b illustrate respective means for magnetising the sensor shafts of FIGS. 1 and 2.

FIG. 3a shows diagrammatically how a circumferential field can be established by a U-shape or horseshoe magnet 59a (which may be an electromagnet) past which the shaft 51 is rotated about its longitudinal axis. The magnetic poles are spaced in the circumferential direction. FIG. 3b shows how a longitudinal field can be established by a U-shaped or horseshoe magnet 59b past which the shaft 51 is rotated about its longitudinal axis B-B to provide an annulus of axially-directed magnetisation. The magnet poles in this case are spaced in the axial direction. More information on the implementation of longitudinal magnetisation of the circumferential-sensing form can be found in above-mentioned application PCT/GB00/03119 (WO01/13081), the disclosure of which is hereby incorporated by reference.

Figure 4:
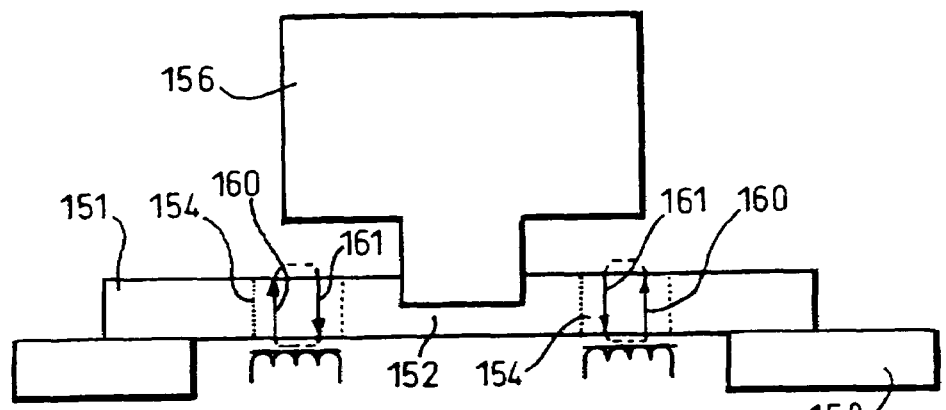
FIG. 4 shows an accelerometer according to the invention using a sensor element of disc form.

FIG. 4 shows another embodiment of the invention in which the flexing of a disc-like member is sensed. In FIG. 4 a disc 151 is mounted at its peripheral margin to an annular base reference member 158. The intermediate inner portion 152 of the disc has a mass-block 156 secured centrally of it. The mass-block is free to pivot about the disc centre at least in the plane of the drawing (one axis sensing) and preferably is movable in a plane normal to the plane of the drawing for two-axis sensing. It will be seen that any pivotal movement of the mass-block 156 will cause a flexing of the disc portion 152. Thus a pivoting of the block 156 to the left (as seen in FIG. 4) will produce a differential flexing of the disc at zones 154. Magnetic fields are established at these zones to provide a magnetic field output that is a function of the movement of the mass-block relative to the reference base. One method of achieving this is to magnetise radially separated portions of each zone 154 the disc from front-to-back of the disc as indicated by arrows 160 and 161. This results in a detectable fringing flux indicated by the dashed lines. Thus, at least the zones 154 should be of magnetisable material. It will be seen this concept is readily extended to multi-axis movements of the disc by making the zones 154 parts of an annulus extending around the centre of the disc. This annulus has an inner ring of magnetisation extending in one direction through the thickness of the disc, and an outer ring of magnetisation extending in the opposite direction through the disc so that the exterior fringing field on each side is also an annulus of radially-extending magnetic field.

For sensing movement of mass-block 56 along one axis a pair of radially opposed saturable inductor sensors 34 are mounted to detect the fringing field and are connected in a circuit that measures the detected field differential magnitude. For two-axis measurement, a second pair of sensors can be similarly mounted orthogonal to the first pair.

Figure 5:
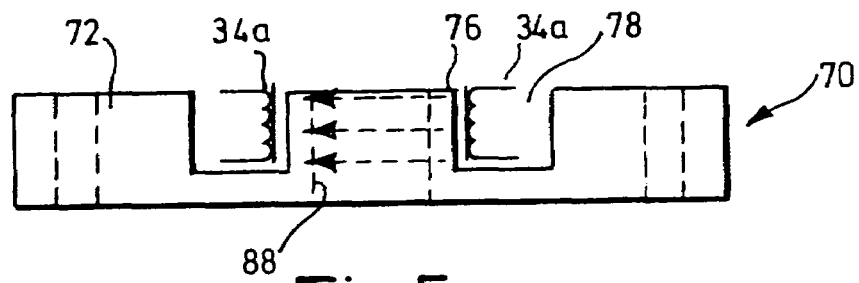
FIGS. 5 and 6 shows side and plan views respectively of another embodiment of an accelerometer using a disc form of sensor.
Figure 6:
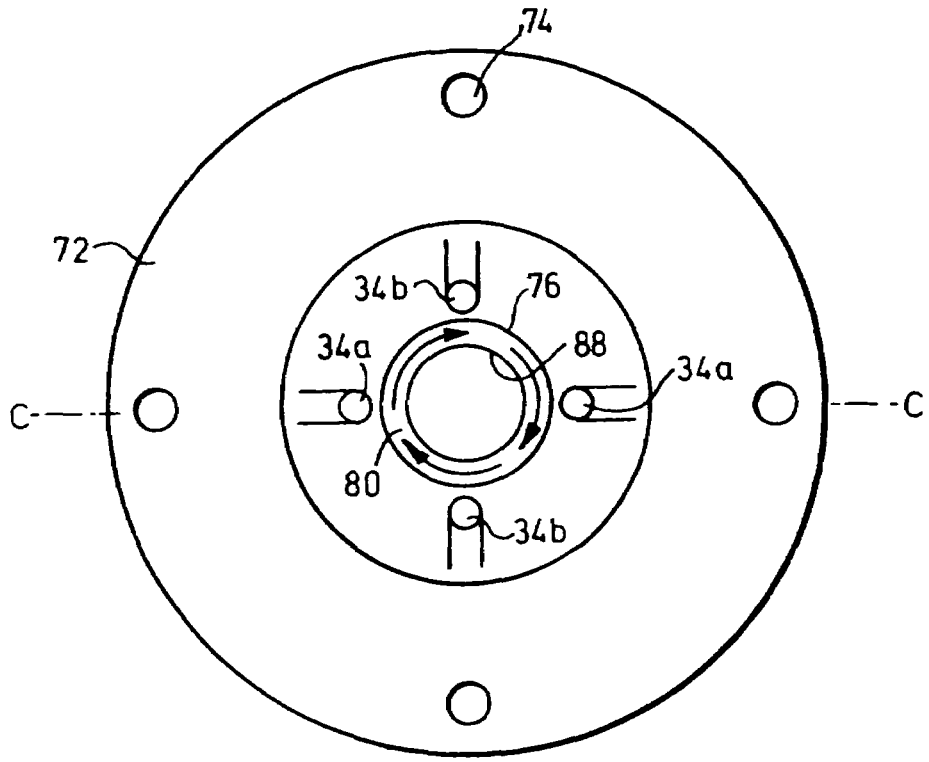
Figure 7:
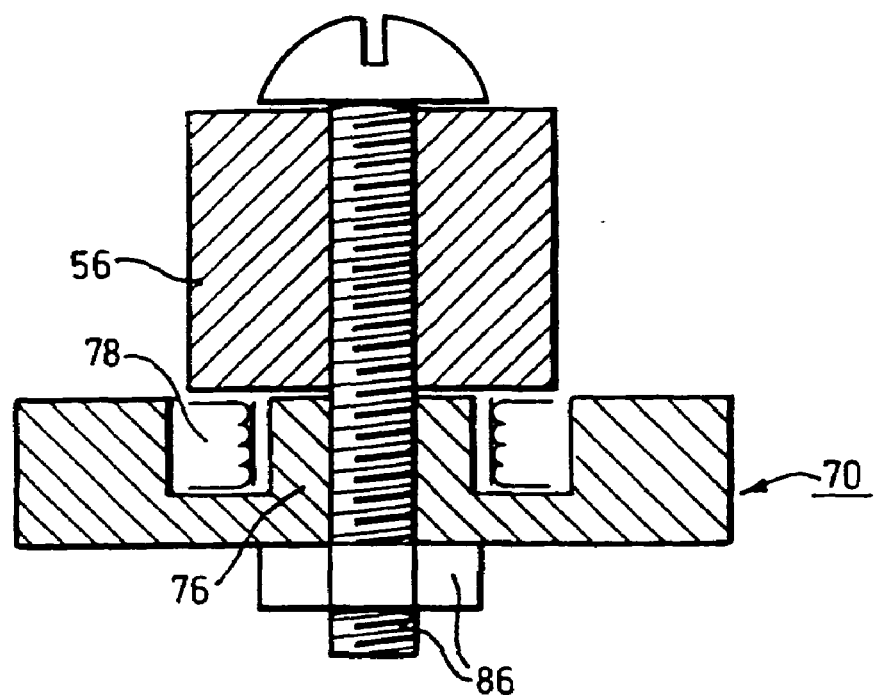
FIG. 7 shows one mechanical arrangement of the accelerometer of FIGS. 5 and 6.

Another form of disc type transducer arrangement is illustrated in FIGS. 5-7. In FIG. 5, the disc structure 70 has a peripheral annular region 72 which is intended for securing to a reference base similarly to FIG. 4. For example the peripheral region may be provided with mounting holes 74 for screws. The structure has a central boss region 76 which is apertured at 88 to receive a mass-block (not shown) in a manner similar to FIG. 4. The core is spaced from the peripheral region 72 by an annular recess 78 and the core itself has an annular peripheral region 80 that is magnetised circumferentially about the disc axis as indicted by the arrows.

Within the recesses saturating inductor sensors are mounted in two orthogonal pairs to detect the magnetic field adjacent the magnetised region 80. As before, provision of two orthogonal pairs 34a, 34b of sensors enables multi-axis resolution. Each pair of sensors is connected in a differential manner to circuits for deriving the acceleration-dependent signals.

The operation of the transducer assembly is as follows.

It is seen from FIG. 5 that the orientation of each saturating inductor is transverse (normal) to the adjacent field in the boss region 80. As is more fully described in WO98/52063, the measurement made by the sensor is dependent on the field being measured affecting the point of saturation of the inductor in one direction and the other. Referring to FIG. 6 if the disc assembly flexed about axis C-C through sense pair 34a—that is the boss region is deflected upwardly or downwardly in the figure—then the field sensed by sensor pair 34b remains normal to the sensor axis of the sensors. However, for sensor pair 34a, the local field will be tilted in one direction for one sensor and on the opposite direction for the opposite sensor. This will add a component positive for one sensor, negative for the other—affecting the switching of the inductor and reflected in the respective sensor output.

The two sensors of each pair 34a, 34b are connected in a differential circuit to provide a measurement of flexing of the disc about an axis through the pair.

FIG. 7 illustrates some mechanical points relating to the accelerometer of FIGS. 5 and 6.

The mass-block 56 is tightly mounted to the disc boss region 76 by glue or a non-magnetic screw and nut 86. It is important that the mass-block does not entirely close, i.e. radially bridge, the annular recess 78 in order to allow the disc structure to flex. If possible the mass-block should not have a non-uniform magnetic field stored in itself to avoid creating a signal-offset in the measurements.

An important feature of the disc-type assemblies that have been described with their differential sensing is that there is no need to compensate for interfering, uniform magnetic fields such as the earth's magnetic field. These disc-type assemblies also find utility in automobiles as described above.

The disc-type assemblies may also operate satisfactorily with other dispositions of the sensors such as radially with the sensors disposed adjacent the base of recess 78. If the transducer region is longitudinally magnetised, the sensors are disposed and oriented to respond to the flexure-dependent component of the field emanated by the transducer region.

Figure 8:
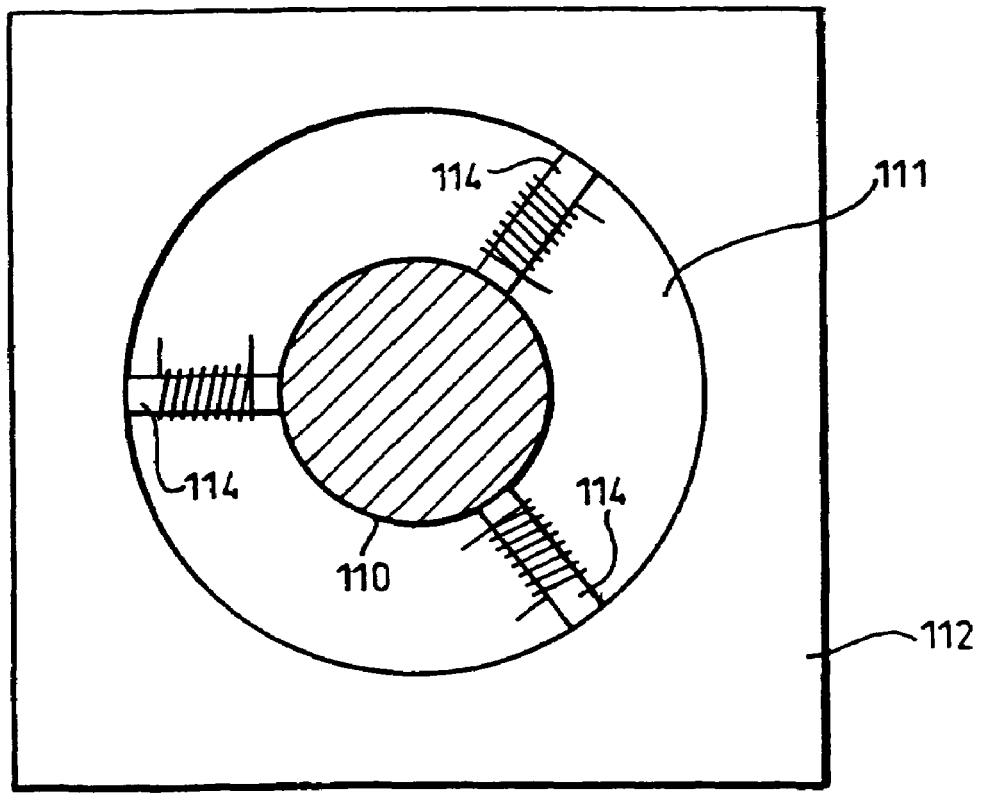
FIG. 8 shows another form of accelerometer according to the invention employing a force-related property of a magnetic material.

An accelerometer relying on a different principle of operation is shown in FIG. 8. In this device a mass-block 110 is mounted in an apertured reference block 112. The block 110 is spaced from the wall of aperture 111 and is supported within it by three (or more) cores 114 of high permeability magnetic material (typically a permeability of 5000-1000 is envisaged). The cores are preferably equiangularly spaced. The three-core case shown has the cores oriented at 120° in the same plane. Each core has an inductor winding 116 on it and each inductor is used as the sensor of a saturable inductor sensor of the kind described in WO98/52063.

It is a feature of the high-permeability magnetic materials used for inductor cores that their permeability varies with the compressive/tensile force applied to them. Consequently the sensor signals derived from the three inductors will reflect forces generated by the mass-block 110 relative to the reference block 112, and can be processed to derive acceleration—representing signals for accelerations in the plane of the drawing.

Three-axis sensing can be realised by suspending the mass-block 110 in a cavity in a three-dimensional reference block. It is suspended by four or more sensors of the kind just described in a three-dimensional array for example the three sensors as shown and at least one additional sensor normal to the plane of the drawing.

The invention claimed is:

1. An accelerometer comprising:
   a reference base;
   a part movable or capable of attempting movement with respect to the base,
   and a member connected between the part and the base to be subject to flexure when the part is accelerated relative to the base, wherein
   the member has at least one region of permanent magnetisation therein from which is emanated an external magnetic field that is a function of the flexure of the member, and a sensor responsive to the external magnetic field to provide a signal representing the external field,
   said sensor being connected in a circuit from which is obtained a signal representing the acceleration of the part relative to the base.

2. An accelerometer as claimed in claim 1 in which the member is a shaft, said at least one region of which is circumferentially or longitudinally magnetised.

3. An accelerometer as claimed in claim 1 in which the member is generally disc-shaped and one of said base and part is connected to a peripheral portion of the disc-shaped member and the other is connected to an inner portion of the disc-shaped member separated by a portion capable of flexure.

4. An accelerometer as claimed in claim 3 in which said inner portion is central of the disc-shaped member and said portion capable of flexure is annular.

5. An accelerometer as claimed in claim 4 in which said portion capable of flexure comprises two spaced, annular regions of permanent magnetisation magnetised through the thickness of the disc-shaped member to emanate an external magnetic field therebetween that varies as a function of the flexure of said portion.

6. An accelerometer as claimed in claim 3 in which the inner portion of the member comprises a boss having an annular region extending in a generally axial direction, said boss having a circumference, and said annular region is magnetised in a closed loop around the circumference of said boss to provide said one region of magnetisation, and said sensor means is mounted adjacent said annular region and is responsive to changes of orientation of said closed loop of magnetisation.

7. An accelerometer as claimed in claim 6 in which the member comprises a relatively thick peripheral portion connected to a relatively thick inner portion by a relatively thin portion capable of flexure and defining an annular recess between the peripheral and inner portions bounded on one side by said magnetised region.

8. An accelerometer as claimed in claim 6 wherein said sensor means comprises two sensor devices disposed on opposite sides of said annular region and differentially-connected to provide said signal dependent on a tilt of said inner portion with respect to said peripheral portion.

9. An accelerometer as claimed in claim 1 capable of at least two-axis sensing of acceleration.

10. An accelerometer comprising two members a first of which is a reference base and the second of which is a part movable with respect to the base, one of said members having an aperture therein bounded by a wall and the other of said members being supported by at least three inductor cores acting between said other member and the wall of said aperture, said inductor cores having a permeability which is a function of tensile and/or compressive forces generated therein by relative movement of said members, each of said cores having a respective winding thereon the core windings being connected in a sensor circuit responsive to changes in the core permeabilities to derive an acceleration-indicative signal.

11. An accelerometer as claimed in claim 10 in which said inductor cores lie in a plane.

12. An accelerometer as claimed in claim 10 in which tow-axis sensing is provided with the aid of said at least three cores.

13. An accelerometer as claimed in claim 10 in which at least one further inductor core is provided to support said part with respect to said reference base, said further inductor further comprising a winding connected to said sensor circuit, said inductor cores being arranged such that three-axis sensing of acceleration is achieved.

14. An accelerometer as claimed in claim 13 in which said inductor cores lie in a plane and said further inductor acts in a direction normal to said plane.

* * * * *